H. J. HICKEY.
FIRE HOSE COUPLING.
APPLICATION FILED FEB. 6, 1909.
941,990.
Patented Nov. 30, 1909.
2 SHEETS—SHEET 2.
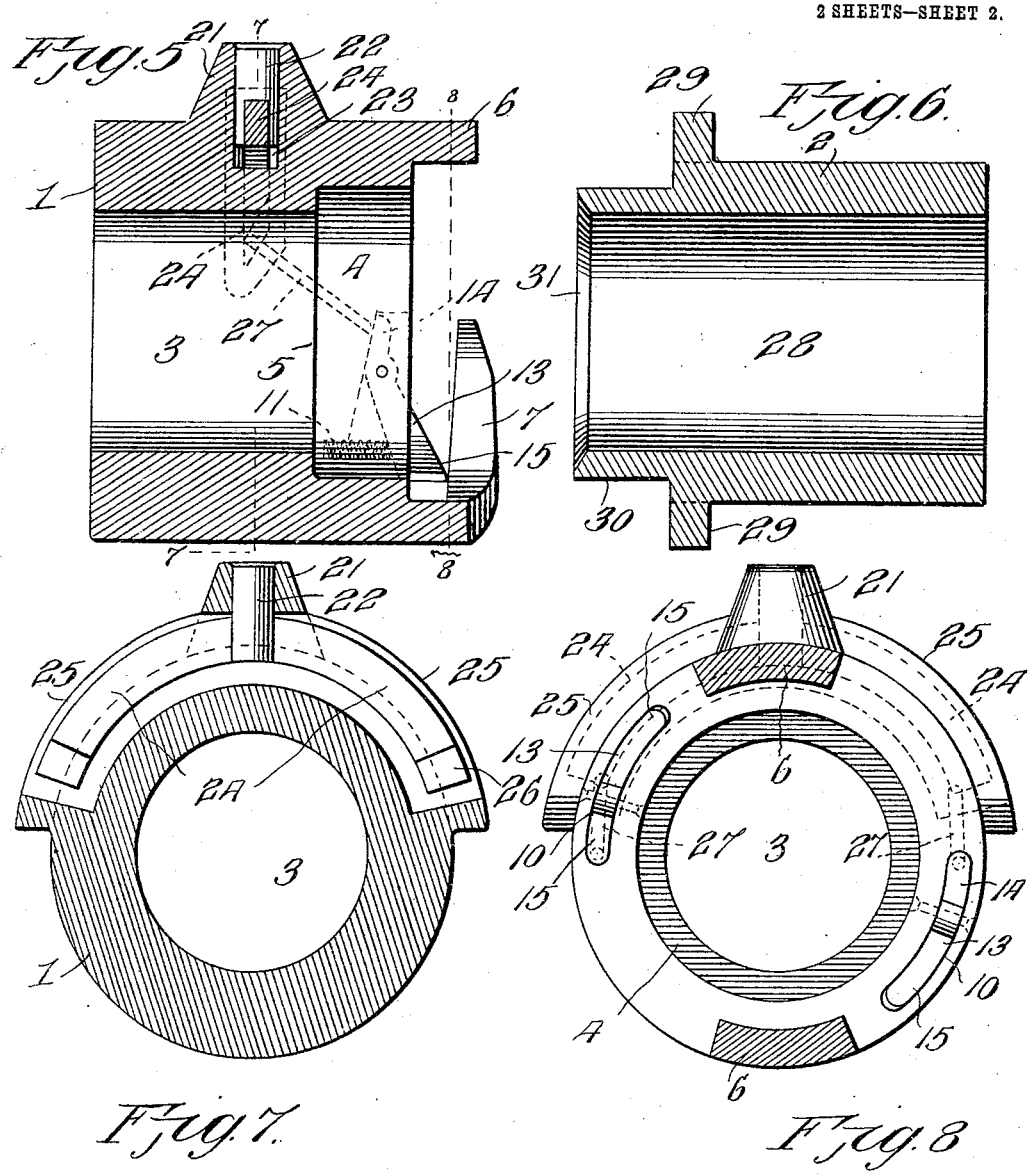
Witnesses
Frank Hough
C. C. Hines
Inventor
Henry J. Hickey,
By Victor J. Evans
Attorney

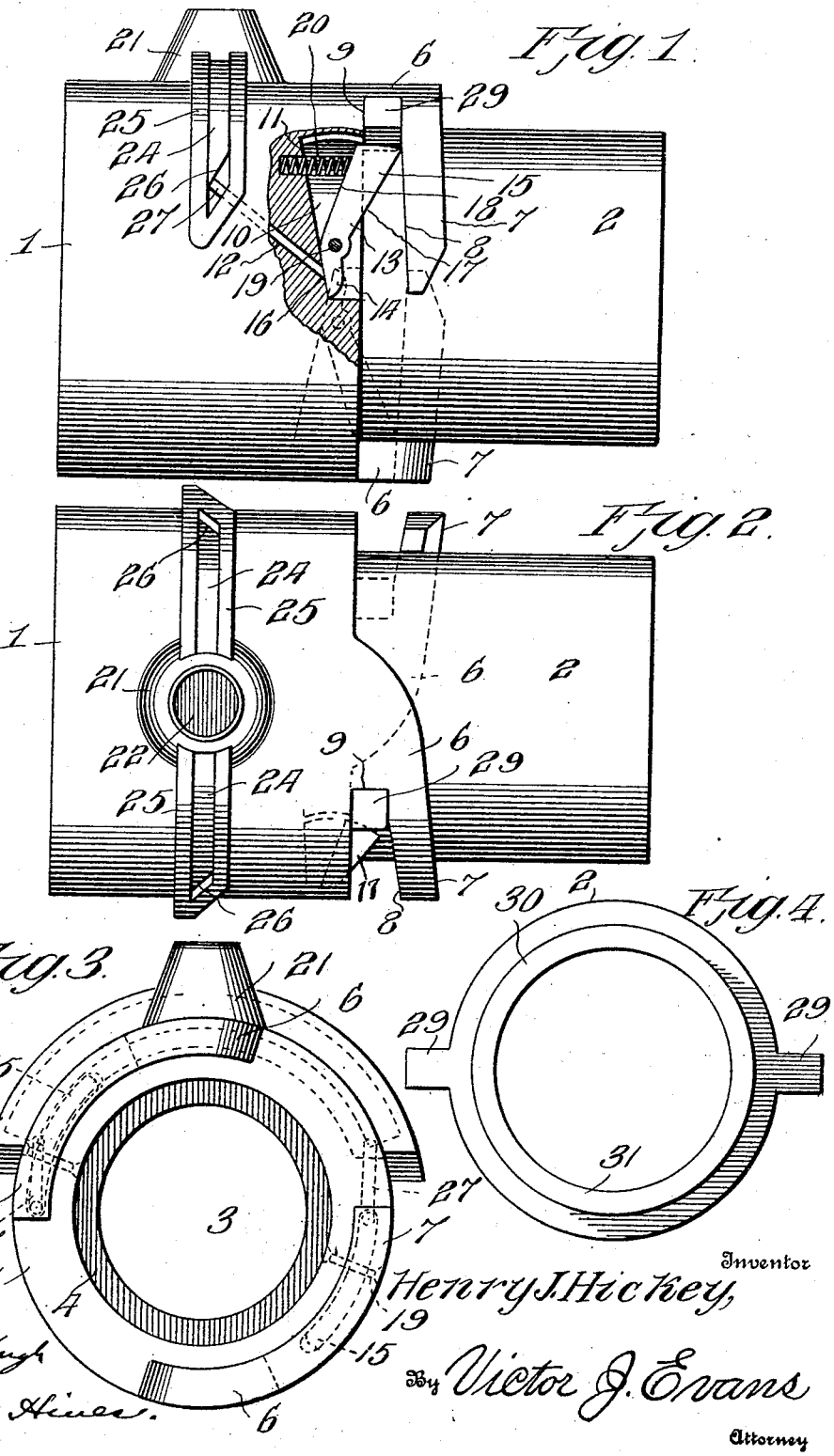

UNITED STATES PATENT OFFICE.

HENRY J. HICKEY, OF TOMAHAWK, WISCONSIN.

FIRE-HOSE COUPLING.

941,990.

Specification of Letters Patent. Patented Nov. 30, 1909.

Application filed February 6, 1909. Serial No. 476,431.

*To all whom it may concern:*

Be it known that I, HENRY J. HICKEY, a citizen of the United States, residing at Tomahawk, in the county of Lincoln and State of Wisconsin, have invented new and useful Improvements in Fire-Hose Couplings, of which the following is a specification.

This invention relates to hose couplings, particularly fire hose couplings, and its object is to provide a simple and effective type of coupling, the parts of which are adapted to be quickly interlocked to couple the hose sections in a secure and absolutely water-tight manner, and which embody an improved construction of locking mechanism whereby accidental separation of the coupled hose sections will be prevented under all conditions of service, and whereby the hose sections cannot be uncoupled until the locking mechanism is manually released.

The invention consists of the features of construction, combination and arrangement of parts hereinafter fully described and claimed, reference being had to the accompanying drawings, in which:—

Figure 1 is a side elevation showing the members of the coupling connected, a portion of the female member being broken away to disclose one of the locking dogs. Fig. 2 is a top plan view of the same. Fig. 3 is an end view of the female coupling member. Fig. 4 is a similar view of the male coupling member. Fig. 5 is a vertical longitudinal section of the female member. Fig. 6 is a similar view of the male member. Fig. 7 is a cross section through the female member on the plane substantially indicated by the line 7—7 of Fig. 5. Fig. 8 is a similar section through the female member on the plane substantially indicated by the line 8—8 of Fig. 5.

Referring to the drawings, 1 and 2 respectively indicate the female and male members of the coupling, the inner or hose-engaging ends of which may be formed in any suitable manner for connection with the hose sections. The member 1 comprises a tubular body having a bore or water passage 3 and provided at its outer or coupling end with a receiving socket 4 of greater diameter than said passage, thus forming an intersecting shoulder 5. Formed at diametrically opposite sides of the coupling end of said member 1 are abutment lugs 6, from which extend laterally in opposite directions counterpart segmental locking hooks or horns 7, each having a beveled inner face 8 terminating adjacent the contiguous end of the associated lug 6. This beveled face forms a flaring passage between the horn and end of the member 1, which passage communicates at its inner end with an angular seat-recess 9 formed between the inner end of the horn and the adjacent portions of the lug and end of the member 1.

Formed in the coupling end of the female member opposite the beveled face of each locking horn is a segmental chamber or recess 10 having its inner wall 11 inclining inwardly and rearwardly from its outer end to gradually increase the depth of said recess inwardly toward the seat-socket 9. Communicating at its forward end with the outer end of this recess 10 is a passage 12, which inclines upwardly and laterally and opens at its rear end outwardly through the adjacent side of the body of the member, the rear ends of the two passages extending exteriorly at diametrically opposite sides of said member. Within each recess 10 is arranged a locking dog 13 having a short outer releasing arm 14 and a long locking arm 15 arranged at an oblique angle thereto, the short arm being formed with a beveled inner face 16 and the long arm with beveled outer and inner faces 17 and 18. This dog is pivotally mounted at the juncture of its arms upon a cross pin 19 and its locking arm is normally pressed outward by a spring 20. In its normal position the beveled face of the arm 14 of the dog bears against the wall 11, while the arm 15 projects outward into and across the passage between the body and hook with its outer corner edge bearing against the latter, whereby the dog closes the seat-socket 9.

A hollow boss 21 is formed upon the member 1 at a point equidistantly between the outer ends of the passages 12 and serves as a guide for a releasing plunger 22, which is movable in said boss and a communicating guide cavity 23 in the body of the member. Fixed to and projecting laterally in opposite directions from said plunger are segmental arms 24 movable vertically in hollow guide ribs or channels 25 and having beveled outer ends 26. These beveled outer ends of the arms engage the outer ends of sliding stems 27 movable in the passages 12, the rear ends of which stems project through the rear ends of the said passages into said channels, while the forward ends of the rods extend into the recesses 10 and bear against the arms 14 of the dogs 13. The outer end of the plunger lies slightly countersunk within the boss so as to prevent it from being depressed by extraneous objects, as when the hose is dragged over the surface of the ground, but is sufficiently exposed to enable it to be depressed by the thumb or finger. The springs 20 serve to normally maintain the dogs and their releasing devices—the plunger, arms and stems—in the position shown in Fig. 1, in which the dogs are projected, and to return them to such position after actuation. By depressing the plunger the arms will be moved downward in their guide channels, thus sliding the stems forward, whereby the stems will swing the dogs to release position, in which the arms 14 will move forward and the arms 15 recede into the recesses 10, as will be readily understood. The male member 2 also comprises a cylindrical body, which is, however, of smaller diameter than the body of the female member, its forward abutting or coupling end forming a shoulder to bear against the coacting end of said female member. It is provided with a bore or passage 28, and a pair of diametrically disposed laterally projecting locking lugs 29 to interlock with the hooks or horns 7, and also with a reduced extension 30 to enter the socket 4 and bear snugly against the shoulder 5. The outer end of the said extension 30 is internally beveled, as at 31, to admit of the reception of a V-shaped gasket so as to secure a water-tight connection.

In the operation of uniting the coupling members, the meeting ends of said members are brought together and adjusted to seat the extension 31 of the male member into the socket 4 of the female member and to dispose the lugs 29 at the entrance ends of the passages between the end of the female member and the locking hooks, after which one of the members is given a quarter-turn to seat said lugs in the sockets 9. As the lugs 29 move along said passages they engage the beveled faces 17 of the dogs and force the arms 15 of the dogs back into the chambers 10, thus allowing said lugs to enter said sockets, whereupon the dogs will be projected by the springs 20 to retain the lugs in the sockets. As the arms 15 of the dogs lie in the path of return movement of the lugs and at an outward angle, it will be apparent that any pressure of the lugs upon the ends of said arms will tend to bind the dogs to a firmer degree in locking position, thus preventing any possibility of the dogs being retracted and freeing the members under a retrograde movement of either one of said members. Hence the members cannot become accidentally separated even under rough usage of the coupling, as in dragging the hose along the street or pavement or through the striking of the coupling against extraneous objects. By, however, manually operating the plunger the dogs may be retracted, allowing ready and easy separation of the members in an obvious manner.

Having thus fully described the invention, what is claimed as new, is:—

1. A hose coupler comprising a male member having lateral locking lugs, a female member provided with hooks to interlock with said lugs through a relative rotary movement of said members, said female member also being provided with recesses in line with the hooks and guide passages leading to said recesses, spring projected pivotally mounted dogs arranged within said recesses and having operating ends disposed in line with said guide passages, releasing stems slidably mounted in said guide passages to engage the operating ends of the dogs, by which the latter may be retracted, arms mounted upon the female member for actuating said stems, and means for simultaneously operating said arms.

2. A hose coupler comprising a male member having lateral locking lugs, a female member provided with hooks to interlock with said lugs through a relative rotary movement of said members, said female member also being provided with recesses in line with the hooks, inclined guide passages leading to said recesses, and guide channels communicating with said passages, spring projected dogs pivotally mounted within said recesses, stems slidably mounted in the guide passages to engage and retract the dogs, arms mounted in the channels and having beveled ends to engage and project the stems, and a plunger for operating said arms.

3. A hose coupler comprising a male member having lateral locking lugs, and a female member provided with hooks to interlock with said lugs through a relative rotary movement of said members, said female member being also provided with spring actuated automatic dogs pivotally mounted therein to retain the lugs within the hooks, releasing stems slidably mounted to engage and retract the dogs, arms for actuating said stems, and an operating device for moving the arms.

In testimony whereof I affix my signature in presence of two witnesses.

HENRY J. HICKEY.

Witnesses:
 W. T. BRADLEY,
 F. P. WERNER.